(12) United States Patent
Millen et al.

(10) Patent No.: US 8,300,788 B2
(45) Date of Patent: Oct. 30, 2012

(54) REGISTRY OF MODULAR SERVICES AND A METHOD FOR AUTOMATICALLY SELECTING AN APPROPRIATE SERVICE TO PROVIDE PARTICULAR LOGICAL GUARANTEES

(75) Inventors: Jonathan Millen, Concord, MA (US); Joshua Guttman, Newton Centre, MA (US); John Ramsdell, Andover, MA (US); Justin Sheehy, Waltham, MA (US); Brian Sniffen, Cambridge, MA (US)

(73) Assignee: The MITRE Corporation, McLean, VA (US)

( * ) Notice: Subject to any disclaimer, the term of this patent is extended or adjusted under 35 U.S.C. 154(b) by 1212 days.

(21) Appl. No.: 11/808,921

(22) Filed: Jun. 13, 2007

(65) Prior Publication Data

US 2008/0310327 A1    Dec. 18, 2008

(51) Int. Cl.
*H04M 3/42* (2006.01)
(52) U.S. Cl. ......... 379/201.01; 379/201.02; 379/201.03; 379/201.05
(58) Field of Classification Search ............. 379/201.01, 379/201.02, 201.03, 201.05; 715/700
See application file for complete search history.

(56) References Cited

U.S. PATENT DOCUMENTS

2006/0069995 A1* 3/2006 Thompson et al. ........... 715/700
* cited by examiner

*Primary Examiner* — Thjuan K Addy
(74) *Attorney, Agent, or Firm* — Sterne, Kessler, Goldstein & Fox PLLC

(57) ABSTRACT

A system, method, and computer program product are provided for selecting a service to provide a service operation.

13 Claims, 8 Drawing Sheets

REGISTRY OF MODULAR SERVICES AND A METHOD FOR AUTOMATICALLY SELECTING AN APPROPRIATE SERVICE TO PROVIDE PARTICULAR LOGICAL GUARANTEES

STATEMENT UNDER MPEP 310

The U.S. Government has a paid-up license in this invention and the right in limited circumstances to require the patent owner to license others on reasonable terms as provided for by the terms of U.S. Army CECOM contract W15P7T-04-C-D199 awarded by the National Security Agency.

BACKGROUND OF INVENTION

1. Field of the Invention

The present invention relates generally to cryptographic network protocols and, more particularly, to a method for automatically selecting an appropriate service to provide particular logical guarantees.

2. Description of the Background Art

Cryptographic network protocols are implemented by programs used for making secure connections over computer networks. In the process of building such a protocol, a highly skilled analyst must typically be employed in order to examine the entire protocol, including all of its components.

A protocol may incorporate a number of components that, together, may be used to perform the routines necessary to implement the protocol. The protocol may rely on services that are independently designed in order to implement the complete protocol, as is often easily accomplished in object-oriented software systems. In a typical object-oriented software system, a programmer of the protocol could define an interface, and could then accept any service that meets the defined interface. This behavior is commonly termed "polymorphism."

Polymorphism appears in a different form in modern Web Services systems. Many Web Services systems use some method of service discovery to identify services on a network and assemble them into a useful system. This typically requires the system and the assembled services to agree on the name of the service or a required function.

A drawback of this kind of flexibility is that there is no way to know that a system composed in this manner will retain any security properties of the individual services. Security analysis of a protocol designed in this manner requires, as previously noted, the examination of the entire protocol and its components. Unfortunately, requiring that the entire protocol be specified before analysis conflicts with the availability of this level of flexibility.

Accordingly, what is desired is a method for retaining the flexibility of polymorphism in a cryptographic network protocol while simultaneously facilitating security verification of the entire protocol and its components.

SUMMARY OF INVENTION

The invention includes a computer-implemented method for selecting a service to provide a service operation. The method includes the steps of receiving a set of service requirements from a caller, identifying one or more services that provide the service requirements, wherein each of the one or more services is associated with a set of preconditions, receiving a set of disclosures from the caller, identifying at least one of the one or more services that has its set of preconditions satisfied by the set of disclosures, selecting one of the at least one of the one or more services, providing the set of disclosures to the selected service, and receiving a reply from the selected service.

The invention additionally includes a computer program product comprising a computer usable medium having computer program logic recorded thereon for enabling a processor to select a service to provide a service operation. The computer program logic includes a first receiving means for enabling a processor to receive a set of service requirements from a caller, a first identifying means for enabling a processor to identify one or more services that provide the service requirements, wherein each of the one or more services is associated with a set of preconditions, a second receiving means for enabling a processor to receive a set of disclosures from the caller, a second identifying means for enabling a processor to identify at least one of the one or more services that has its set of preconditions satisfied by the set of disclosures, a selecting means for enabling a processor to select one of the at least one of the one or more services, a providing means for enabling a processor to provide the set of disclosures to the selected service, and a third receiving means for enabling a processor to receive a reply from the selected service.

The invention furthermore includes a system capable of selecting a service to provide a service operation. The system comprises a first module to receive a set of service requirements from a caller, a second module to identify one or more services that provide the service requirements, wherein each of the one or more services is associated with a set of preconditions, a third module to receive a set of disclosures from the caller, a fourth module to identify at least one of the one or more services that has its set of preconditions satisfied by the set of disclosures, a fifth module to select one of the at least one of the one or more services, a sixth module to provide the set of disclosures to the selected service, and a seventh module to receive a reply from the selected service.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

DETAILED DESCRIPTION

I. Introduction

Figure 1:
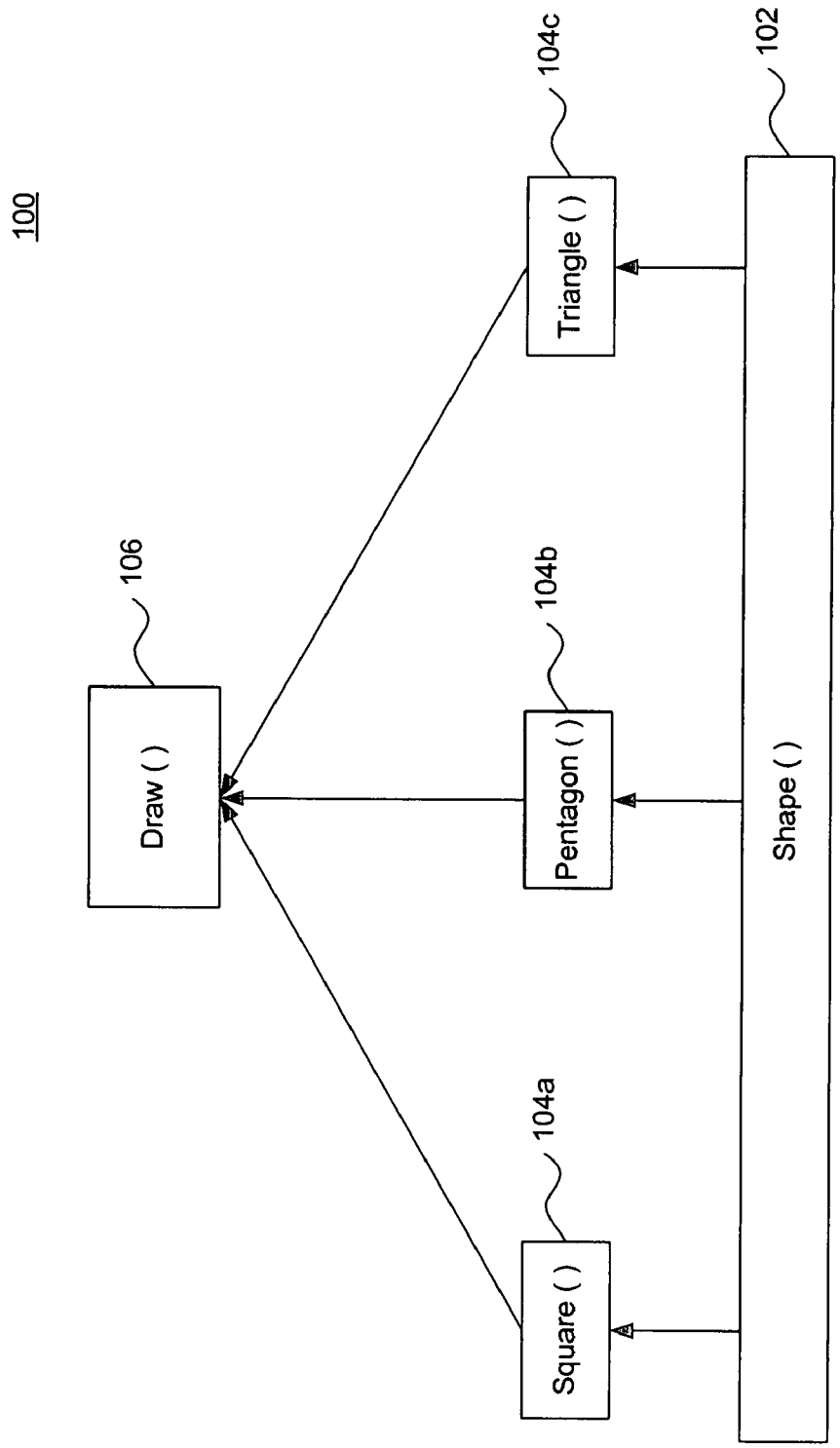
FIG. 1 illustrates a traditional object oriented polymorphism system.

FIG. 1 illustrates a typical polymorphic system 100. A basic behavior is defined, such as shape 102, from which objects can be created that behave in a manner consistent with the basic behavior. For example, square 104a, pentagon 104b and triangle 104c can be defined to include basic behavior from shape 102. Such behavior can include, in the case of shapes, information such as the location of vertices that are common to all of the above shapes.

Draw function 106 can take any of square 104a, pentagon 104b, or triangle 104c as a parameter when instructed to draw the passed object. Rather than having to implement a different draw function 106 for each, a single function is implemented that utilizes the common aspects of all shapes 102 to complete its work. By writing a draw function 106 in this manner, a developer need not write the function to anticipate specifically whether a square 104a, pentagon 104b, or triangle 104c is being passed. If all shapes 102 share a vertex list, then draw function 106 may simply expect the presence of this vertex list and utilize it in drawing whatever shape it happens to receive.

A further advantage of this technique, commonly called "polymorphism," is that additional shapes may be created that meet the basic behavior of shape 102. Should a developer decide to add an octagon shape (not shown), it need simply implement the basic behavior of shape 102, such as including a list of vertices, and the new shape is automatically capable of utilizing the existing draw function.

Similarly, additional functions can be added to utilize existing shape 102 behavior that apply to all extensions thereof. For example, a developer could create a second, more efficient draw function 106 that can be readily substituted for the existing draw function.

While these basic techniques have been in place for some time, the demands of cryptographic protocols limit their use. The implementation of cryptographic protocols requires the verification of the entire system for its ability to meet security and correctness goals. When certain components are undefined, such as, in the example, an additional draw function 106 or additional shapes, such as the proposed octagon shape, there is presently no acceptable way to ensure that the components provide any measure of security or work as expected.

In a typical polymorphic system, a client requesting the use of a service, such as the service provided by draw function 106, must know the parameters required by the service and how to locate the service. The service performs some computation and provides a result to the client. Unless the client is able to trust the service, there is no guarantee as to the reliability of the result nor whether the service protects any data that needs protection.

II. Developing a Trusted System

Figure 2:
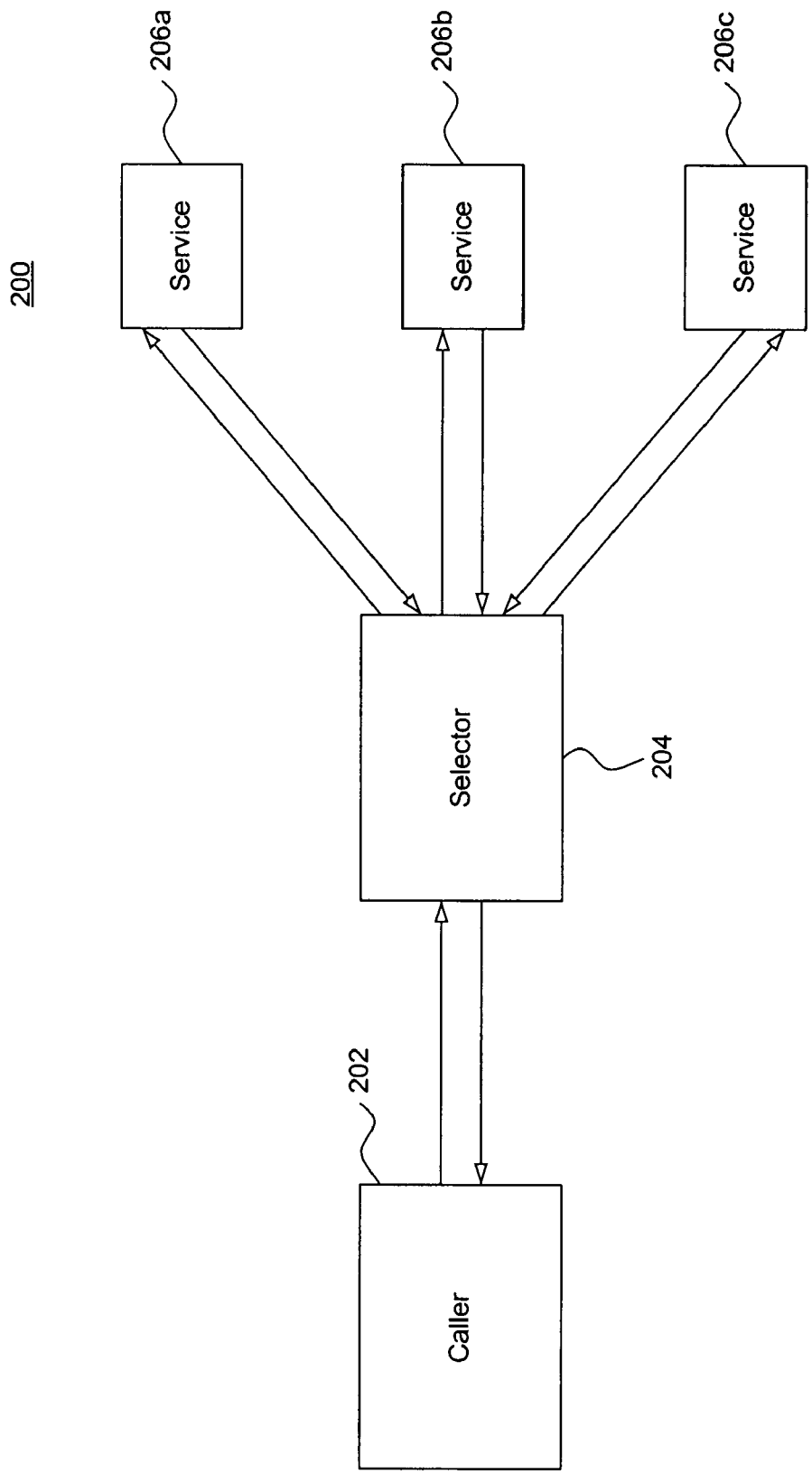
FIG. 2 depicts a system for brokering a secure caller-service communication, in accordance with an embodiment of the present invention.

In accordance with an embodiment of the present invention, a relationship between a client ("caller") and a service is brokered by a trusted selector component. FIG. 2 illustrates a system 200 in which such a relationship is established. A caller 202 requires a particular service. The caller 202 contacts a trusted selector 204 and indicates to the selector that it has available a certain precondition and is in need of a particular post-condition. The selector 204 identifies a service from a set of services, such as services 206a-206c, that can produce the resulting post condition given a set of parameters available in caller 202. A service, for example, service 206a, has its own set of preconditions and post-conditions. A service may be selected for a call request if there exists a parameter mapping that assigns values to service inputs from caller inputs, and caller outputs from service outputs, such that the service precondition and the caller post-condition are both satisfied.

Figure 3:
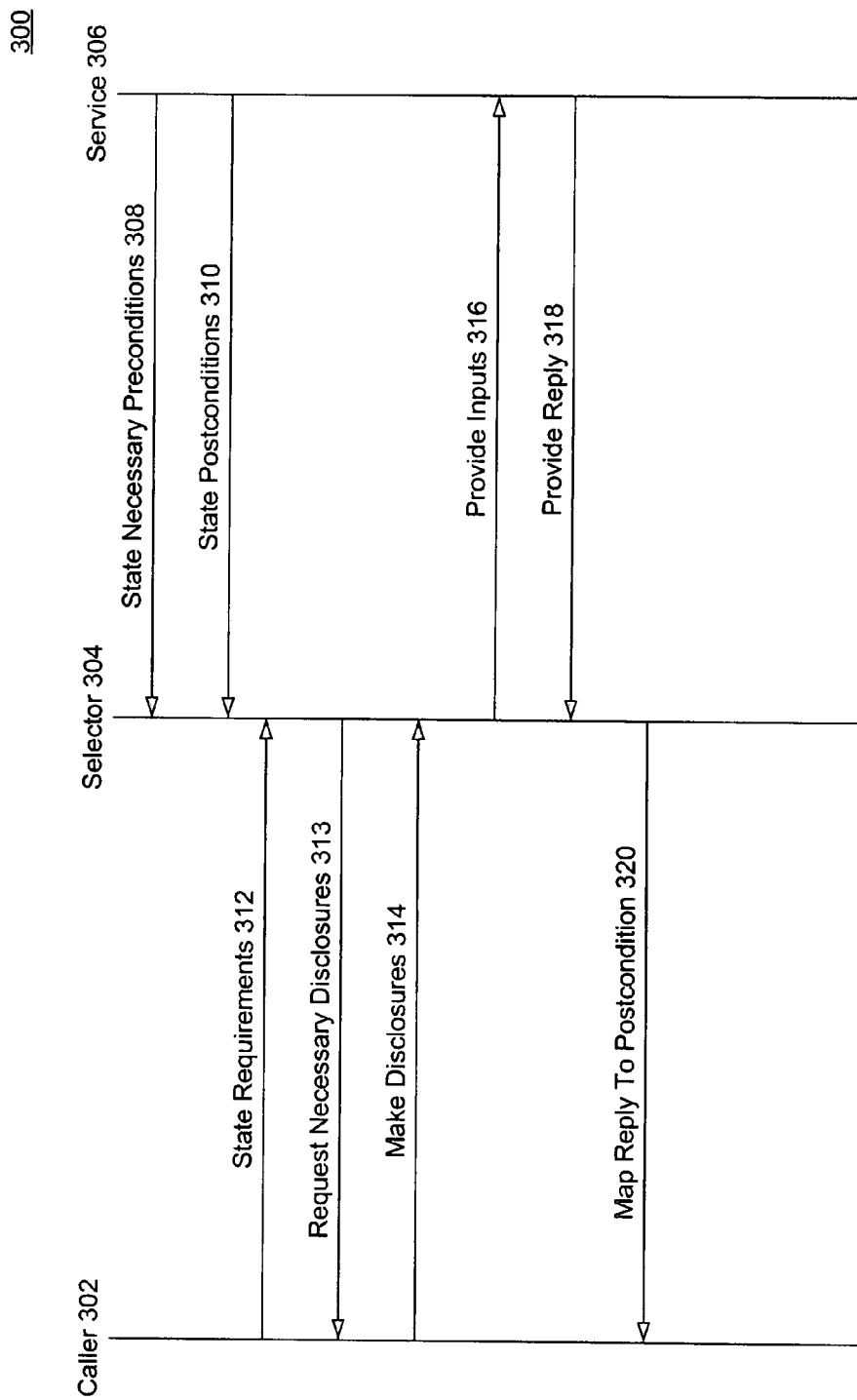
FIG. 3 is a signal flow/interaction diagram illustrating the steps by which a caller is operable to request a service from a selector, in accordance with an embodiment of the present invention.

FIG. 3 is a signal flow/interaction diagram 300 illustrating steps by which a caller 302 is operable to request a service 306 from selector 304, in accordance with an embodiment of the present invention. Selector 304 is operable to implement a selector theory with conversion rules for translating between caller and service predicate vocabularies. To this end, one or more services, such as service 306, register with selector 304 by stating the necessary preconditions 308 and stating the post-conditions 310 of the service, in accordance with an embodiment of the present invention. Caller 302 then states its requirements 312 to selector 304.

Knowing the requirements of caller 302, selector 304 considers the post-conditions for all registered services to determine which service is capable of meeting the requirements. In accordance with an embodiment of the present invention, a service meets the requirements of caller 302 if it provides at least the requirements stated by caller 302.

For a service, such as service 306, identified by selector 304 as capable of meeting the requirements of caller 302, selector 304 considers the necessary preconditions provided by the service when it registered. The requirements provided by caller 302 further provide information regarding what disclosures the caller is capable of making, in accordance with an embodiment of the present invention.

In accordance with an embodiment of the present invention, if more than one service is capable of meeting the stated requirements with its post-conditions, and further can obtain the necessary disclosure from the caller 302 to meet its preconditions, then the selector 304 selects the service with the fewest necessary disclosures.

With a service selected, the selector 304 requests the necessary disclosures 313 which will meet the preconditions of service 306 from caller 302. In response, caller 302 provides the disclosures 314. Selector 304 provides these disclosures as inputs 316 to service 306 and receives a reply 318. As previously stated, it is possible that the service functionality is broader than what is required by caller 302. Accordingly, selector 304 will need to determine the logical relationship between the preconditions and post-conditions of service 306 and map the disclosures to the service inputs in a manner which will achieve the desired reply. Furthermore, with the reply obtained, the resulting data is mapped to the caller's post-conditions 320 to provide the result.

One skilled in the relevant arts will appreciate that the order of the operations shown in FIG. 3 need not be limited to the order presented, but that communications between caller 302, selector 304, and service 306 may occur in a number of different orders.

III. Using Multiple Services

Figure 4:
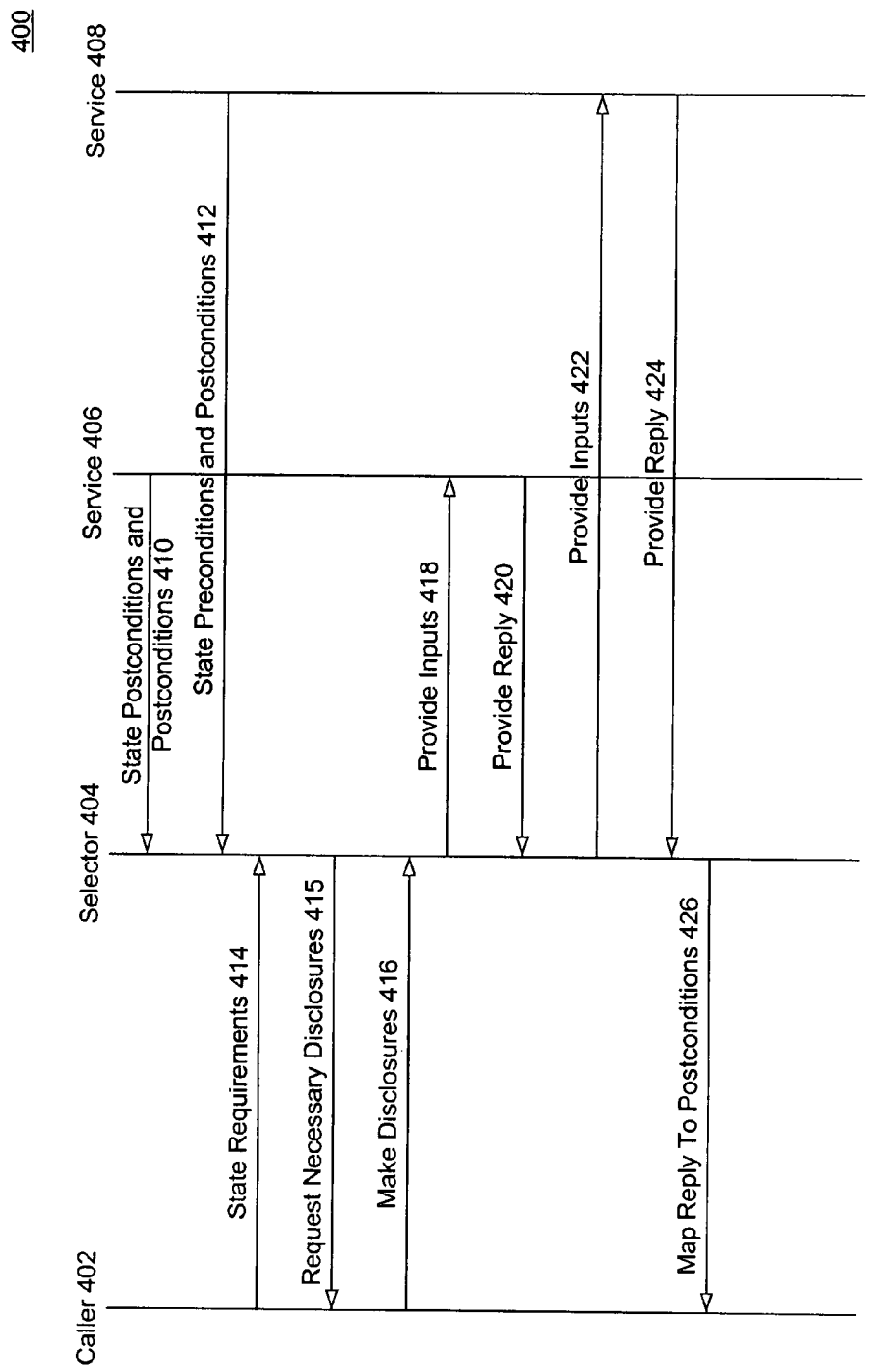
FIG. 4 is a signal/flow interaction diagram illustrating the steps by which a caller is operable to request multiple services from a selector, in accordance with an embodiment of the present invention.

Under certain circumstances, it may not be possible to utilize a single service to obtain the results desired by a caller. Accordingly, a means by which multiple services can be chained together to provide a result is desirable. FIG. 4 is a signal/flow interaction diagram 400 illustrating steps by which a caller 402 is operable to request a result from selector 404 that requires the use of two services, service 406 and service 408, in accordance with an embodiment of the present invention.

In this situation, service 406 and service 408 register with selector 404 by stating their respective preconditions and post-conditions 410 and 412. As before, caller 402 states its requirements 414. Selector 404 then determines what service is capable of providing the requirements. In doing so, selector 404 finds that neither service 406 nor service 408 independently can provide the requirements. However, selector 404 determines that the combination of service 406 and service 408 has preconditions that are met by the disclosures that caller 402 can provide and has post-conditions that would satisfy the caller's own requirements. Accordingly, the selector 404 requests the necessary disclosures 415 from the caller 402, which in turn provides the disclosures 416 to the selector.

In accordance with an embodiment of the present invention, the combination of service 406 and service 408 can provide the necessary requirements through the process of chaining. In accordance with an additional embodiment of the present invention, the combination of service 406 and service 408 and provide the necessary requirements through the process of branching. These two processes are described further herein with continued reference to FIG. 4.

Figure 5:
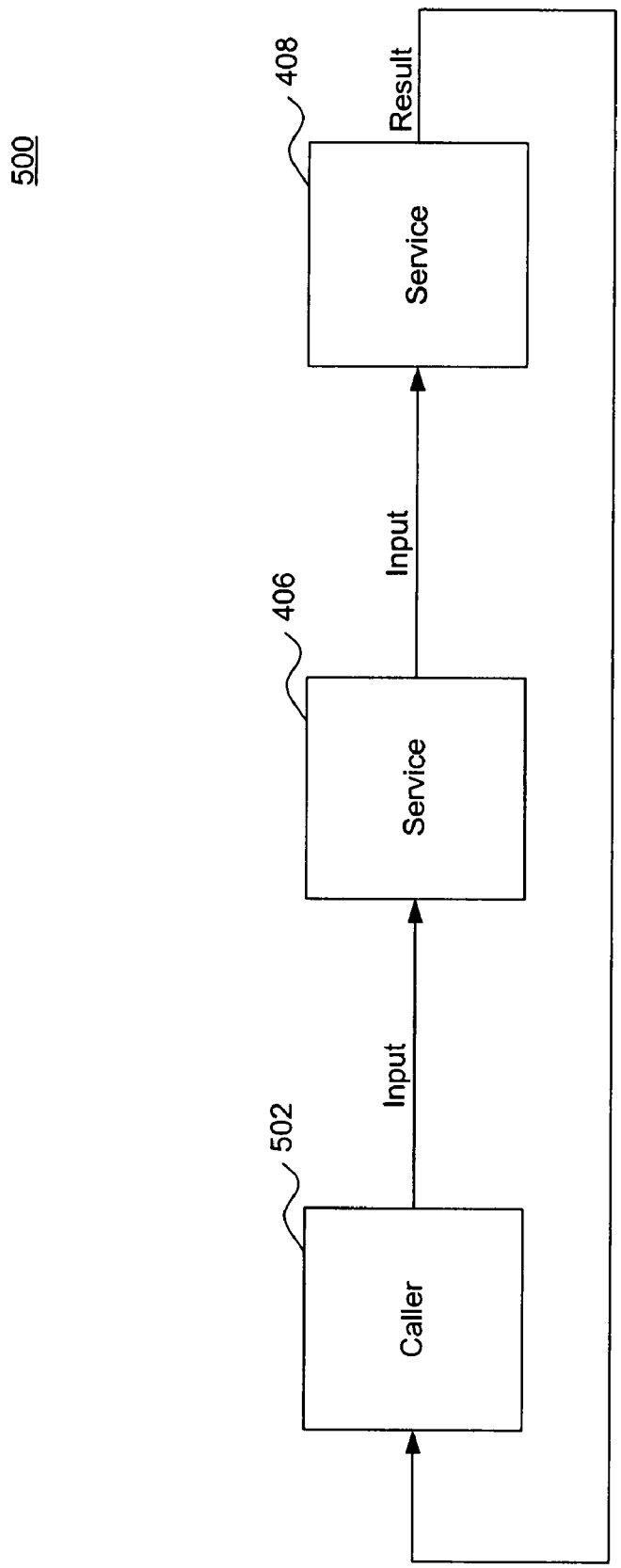
FIG. 5 depicts a service chain configuration, in accordance with an embodiment of the present invention.

Chaining is used when one service provides all the necessary post-conditions to satisfy the requirements of a caller, but the necessary preconditions to utilize the service are not available. However, a second service exists which is available to provide the necessary preconditions for the first service, and the preconditions for this second service are available from the caller's disclosures. FIG. 5 illustrates the chaining process 500 at a high level view, in accordance with an embodiment of the present invention. At step 418 of FIG. 4, inputs 418 are provided to service 406 and a reply 420 is received at selector 404. This corresponds to caller 502 in FIG. 5 providing the necessary inputs for service 406. Selector 404 then provides inputs 422 to service 408. However, in an embodiment, these inputs correspond to the reply 420 provided by service 406. FIG. 5 illustrates this behavior by showing the output of service 406 as an input to service 408. Service 408 then provides a reply 424 which is the basis of a result provided to caller 402. This reply 424 is mapped to the caller's requirements 426 and sent.

Figure 6:
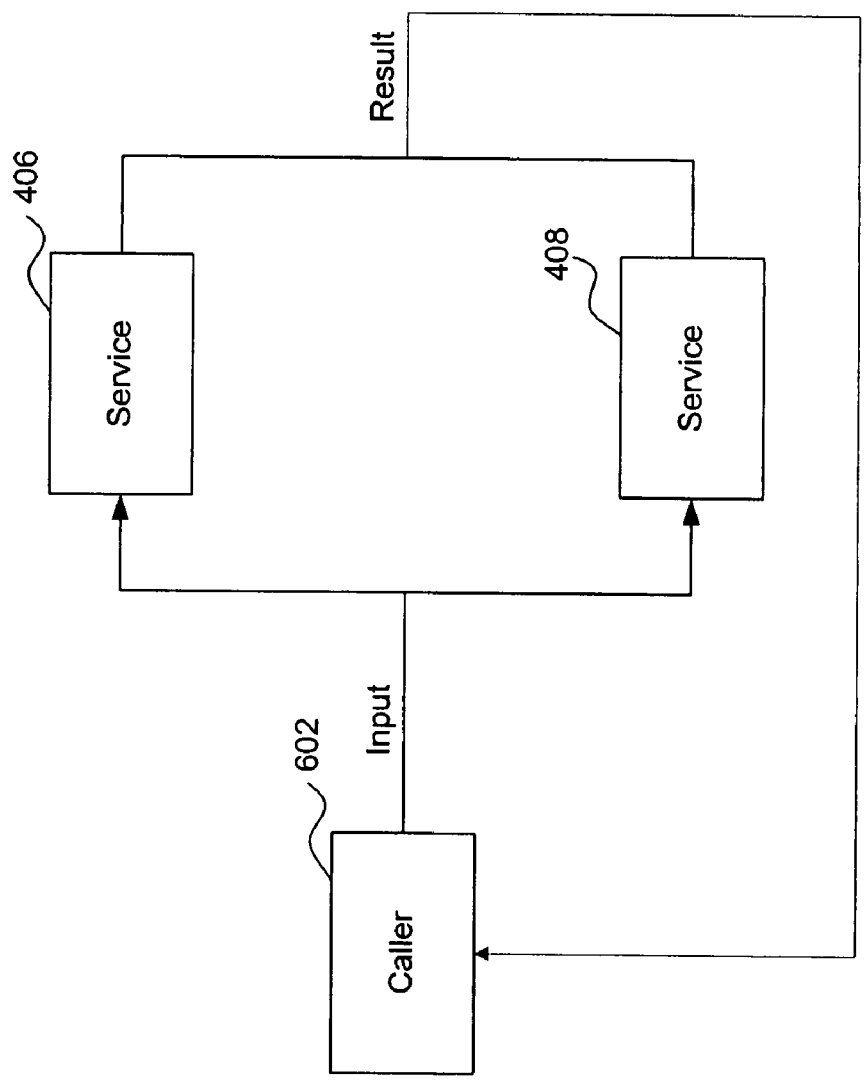
FIG. 6 depicts a service branch configuration, in accordance with an embodiment of the present invention.

In branching, no single service provides all the necessary post-conditions, but some combination of services is available which is capable of providing all of the post-conditions. Furthermore, the preconditions for each of these services is available from the caller's disclosures. FIG. 6 illustrates the branching process 600 at a high level view, in accordance with an embodiment of the present invention. As before, inputs 418 are provided to service 406 and a reply is received 420. Inputs 422 are also provided to service 408 and a reply is received 424. This is illustrated in FIG. 6 by caller 602 providing inputs to both service 406 and service 408 and receiving a result from each. The combined result from both service 406 and service 408 meets the requirements of caller 402, and selector 404 is then operable to map the reply to the caller's requirements 426.

One skilled in the relevant arts will appreciate that any combination of chaining and branching methods may be employed in order to identify and utilize multiple services to provide the requirements for a requesting caller.

IV. Selecting a Service

As previously disclosed, a service is selectable for a call request if there exists a parameter mapping that assigns values to service inputs from caller inputs, and caller outputs from service outputs, such that the service precondition and the caller post-condition are both satisfied. A request from a caller has a precondition formula $p_c$ and a post-condition formula $q_c$. Each service has a precondition $p_s$ and a post-condition $q_s$.

In accordance with an embodiment of the present invention, a service is selected by proving that the necessary parameter mapping exists. Specifically, we must prove that the caller's precondition $p_c$ maps to the service precondition $p_s$, and that the service post-condition $q_s$ maps to the caller post-condition $q_c$ according to some rule T. In accordance with an additional embodiment of the present invention, the service is trusted such that precondition $p_s$ implies post-condition $q_s$ for a certain set of parameters.

Since callers and services likely use a different parameter set, it is often necessary to perform a substitution to determine the proper mapping. This is accomplished by identifying all variable bindings $\beta$ such that some formula q with its parameters abstracted (denoted by $\alpha$) is provable from some rule T and another formula p, that is, $$T, p \vdash q\alpha\beta.$$

If we let $\sigma = \alpha\beta$, we see that we have found a substitution $\sigma$ of parameters into values such that $$T, p \vdash q\sigma.$$

For a precondition, post-condition pair (for either a service or a caller), the notation $I = A(p)$ is used for its input parameters, $O = A(q) \setminus A(p)$ for its output parameters, and $P = I \cup O$ for all of its parameters. Furthermore, subscript notations s and c refer to a service or a caller, respectively.

In accordance with an embodiment of the present invention, a service contract is a pair of node formulas $(p_s, q_s)$ such that $P_s \subseteq X$ and, for all $\sigma$ on $I_s$ into Z, $$p_s\sigma \Rightarrow (\exists \tau) q_s \sigma \tau$$

where $\tau$ is on $O_s$ into Z.

Accordingly, a service may be independently selectable to meet the needs of a caller request $(p_c, q_c)$ if, for any input substitution $\sigma_e: I_c \to Z$, there exist substitutions $\sigma_c: P_c \to Z$ extending $\sigma_e$ and $\sigma_s: P_s \to Z$ such that:

$$T, p_c \sigma_c \vdash p_s \sigma_s, \qquad 1.$$

$$p_s \sigma_s \Rightarrow q_s \sigma_s, \qquad 2.$$

and $$T, q_s \sigma_s \vdash q_c \sigma_c, \qquad 3.$$

for any input substitution, and would be non-independently selectable if it were selectable only for some inputs, in accordance with an embodiment of the present invention. In accordance with an embodiment of the present invention, the aforementioned steps can be performed utilizing Datalog.

In accordance with an embodiment of the present invention, the selector algorithm is implemented as follows. Let $S(\phi)$ be a sequence of the parameters in formula $\phi$. Each parameter in $S(\phi)$ occurs once, and the parameters are ordered by their first appearance in the formula. Let $V(\vec{X})$ be a sequence of distinct variables of the same length as $\vec{X}$ ($V(\vec{X})$ can be the $\vec{X}$-length initial subsequence of a long fixed variable sequence). Let $r::\vec{X}$ be the literal constructed from predicate symbol r and the sequence of terms $\vec{X}$. Let $p[\vec{X}]$ be the formula in which each parameter in $\vec{X}$ is replaced in p by its corresponding variable in $V(\vec{X})$. Thus, $p[\vec{X}]$ is an abstraction of p over a specific set of parameters. The concatenation of sequences $\vec{X}_1$ and $\vec{X}_2$ is $\vec{X}_1 \cdot \vec{X}_2$. The subsequence of $\vec{X}_1$ elements that are not in $\vec{X}_2$ is $\vec{X}_1 \setminus \vec{X}_2$.

Note that, in general, a substitution σ on a set X can be represented with respect to an ordering $\vec{X}$ by a result vector $\vec{Y}$ such that $\sigma(x) = \vec{Y}(\vec{X}^{-1}(x))$. Therefore, it is possible to write $\sigma = \vec{Y}/\vec{X}$. If substitutions $\sigma_i = \vec{Y}_i/\vec{X}_i$ have disjoint domains, $\sigma_1 \cup \sigma_2 = \vec{Y}_1 \cdot \vec{Y}_2 / \vec{X}_1 \cdot \vec{X}_2$. Also, $(\sigma \circ \tau)(x) = \sigma(\tau(x))$ and $(\sigma \circ \vec{X})(i) = \sigma(\vec{X}(i))$.

A contract in the implementation is a 5-tuple $(p_s, q_s, \vec{T}_s, \vec{O}_s, s)$, where s is the name of the procedure that implements the service. The service contract of s is $(p_s, q_s)$, the input parameter sequence of s is $\vec{T}_s$, and the output parameter sequence of s is $\vec{O}_s$.

A caller provides a triple $(p_c, q_c, \vec{Z}_c)$, where the caller's pre- and post-condition are $(p_c, q_c)$, and the values associated with the parameters in $S(p_c)$ are given by $\vec{Z}_c$. Thus, $\sigma_e = \vec{Z}_c / \vec{T}_c$ for $\vec{T}_c = S(p_c)$. In accordance with an embodiment of the present invention, a call is not properly formed if the length of $\vec{Z}_c$ differs from the length of $\vec{T}_c$. Let $\vec{O}_c = S(q_c) \setminus S(p_c)$.

If the selector algorithm determines that a service s is selectable, and then selects it, it invokes the service with a sequence of input values $\vec{Z}_s$ and a sequence of natural numbers $\vec{N}_s$. $\vec{N}_s$ is defined below, and tells the service which values to return, and in which order, corresponding to caller outputs.

The selector algorithm, in accordance with an embodiment of the present invention, is as follows. First, rename parameters in the service contract to ensure that service parameters do not occur in caller's formulas. Next, assert each literal in $p_c$. Then, for each literal in $q_s[\vec{T}_s]$ assert $q_s^i[\vec{T}_s] := \neg p_s[\vec{T}_s]$. If any clause is not safe, the service s is not selectable. These rules represent the contract. Let r be a fresh predicate symbol. Assert $r :: V(\vec{T}_s \cdot \vec{O}_c) :- p_s[\vec{T}_s \cdot \vec{O}_c], q_c[\vec{T}_s \cdot \vec{O}_c]$. If the clause is not safe, the service s is not selectable. If an instance of $r :: V(\vec{T}_s \cdot \vec{O}_c)$ is derivable, then the service s is selectable.

Let $r :: \vec{I}_s \cdot \vec{O}_c$ be a derived instance of $r :: V(\vec{T}_s \cdot \vec{O}_c)$. The input values $\vec{Z}_s$ required by the service are obtained as $(\vec{Z}_c / \vec{T}_c) \circ (\vec{I}_s / \vec{T}_s) \circ \vec{T}_s$. The number sequence $\vec{N}_s$ given to the service is obtained as $(\vec{I}_s \cdot \vec{O}_s)^{-1} \circ \vec{O}_c$. The service then executes and produces its own output values $\vec{Z}_o$. It then produces the sequence of values for caller outputs as $\vec{Z}_s \cdot \vec{Z}_o \circ \vec{N}_s$.

V. Using Outside Services

Occasionally, a service may be required to consult with an additional, untrusted module in order to obtain some information necessary in generating a reply. When such consultation is needed, the service may need to provide data to the module, and this data may include a disclosure made by a caller.

Figure 7:
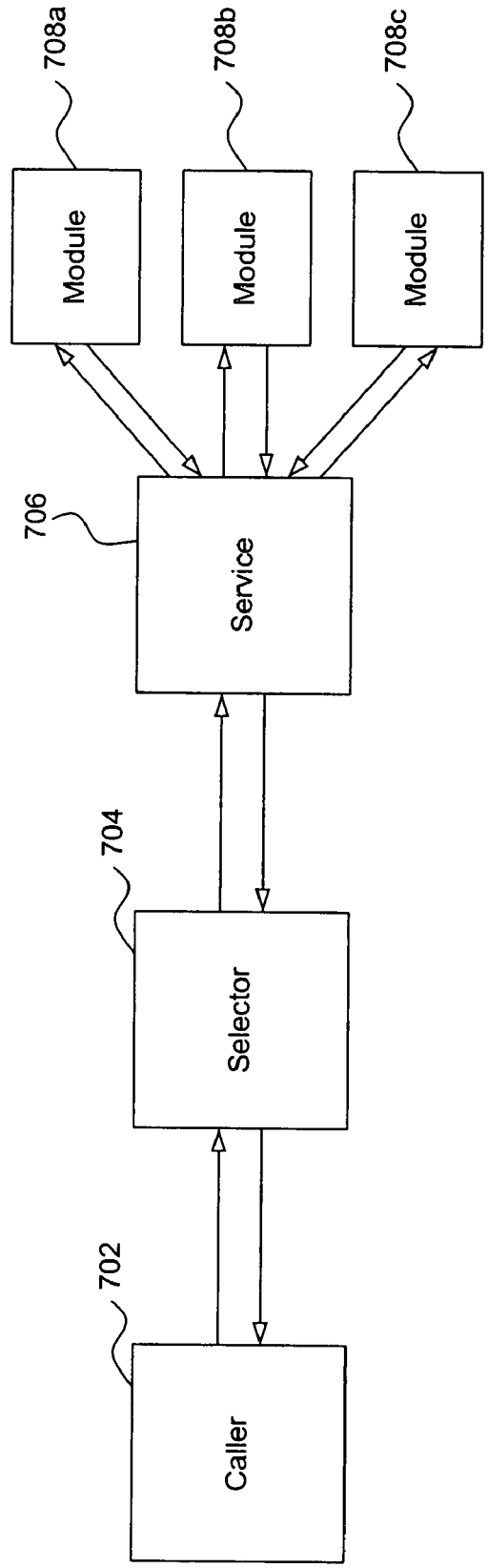
FIG. 7 depicts a system for brokering a secure caller-service communication where a service relies on insecure modules, in accordance with an embodiment of the present invention.

Due to the possibility of security issues at this step, a caller and service can provide additional requirements and guarantees that establish what parameters may be used for and what they will be used for. Such restrictions may be termed "non-disclosure agreements" (NDAs). FIG. 7 illustrates a service configuration 700 in which a caller 702 interacts with a selector 704 to utilize service 706, the service 706 relying on modules 708a-708c to assist in its computations, in accordance with an embodiment of the present invention. When caller 702 states its requirements to selector 704, it may optionally provide a limitation on the usage of any disclosures it makes. Such a limitation may include, for example, a restriction on transmitting a parameter outside of service 706. Furthermore, when registering with selector 704, service 706 can provide in its guarantees that it will not disclose a parameter to an outside entity. In accordance with an additional embodiment of the present invention, service 706 may specify that it will only disclose information to a subset of its modules, such as modules 708a-708c, and this would be acceptable if caller 702 indicated in its requirements that disclosure to these modules is acceptable.

If these requirements and guarantees are acceptable to both caller 702 and service 706, then selector 704 may choose service 706 to act as the service for a call made by caller 702.

In accordance with an embodiment of the present invention, an NDA associates a predicate on message terms with each parameter of a role. The NDA v(x) of a parameter x expresses a constraint on the way x may be released. The predicate formula is not necessarily restricted to the language of node formulas.

In accordance with a further embodiment of the present invention, a secure service request is a 4-tuple $(p_c, q_c, \sigma_e, v)$ of a caller precondition, a caller post-condition, an input value substitution, and an NDA defined on the caller parameters $P_c$. A secure service contract is a triple $(p_s, q_s, v)$ where v is defined on the service parameters $P_s$. The contract $(p_s, q_s, v)$ is securely selectable for $(p_c, q_c, \sigma_e, v)$ if it is uniformly selectable with parameter mappings $\sigma_i, \sigma_o$ and $$\text{if } x \in I_s \text{ then } v(x)\sigma_i \Rightarrow v(x\sigma_i)\sigma_o \quad (1)$$

and $$\text{if } y \in O_c \text{ then } v(y\sigma_o)\sigma_i \Rightarrow v(y)\sigma_o. \quad (2)$$

Condition (1) says that the constraint on a service input is stricter than the constraint on the caller input to which it maps. Condition (2) says that the constraint on a service output is stricter than the constraint on any caller parameter mapped to it.

In accordance with an embodiment of the present invention, the mapping applied to the v sets are necessary to make them comparable. This is easy to understand if one considers the way terms are mapped to values. With uniform selection, a caller term t gets the value $t\sigma_c = t\sigma_o \sigma_e \sigma_r$, and a service term t' gets the value $t'\sigma_s = t'\sigma_i \sigma_e \sigma_r$. So if $t\sigma_c = t'\sigma_i$ then t and t' are mapped to the same value.

VI. Example Computer System Implementation

Figure 8:
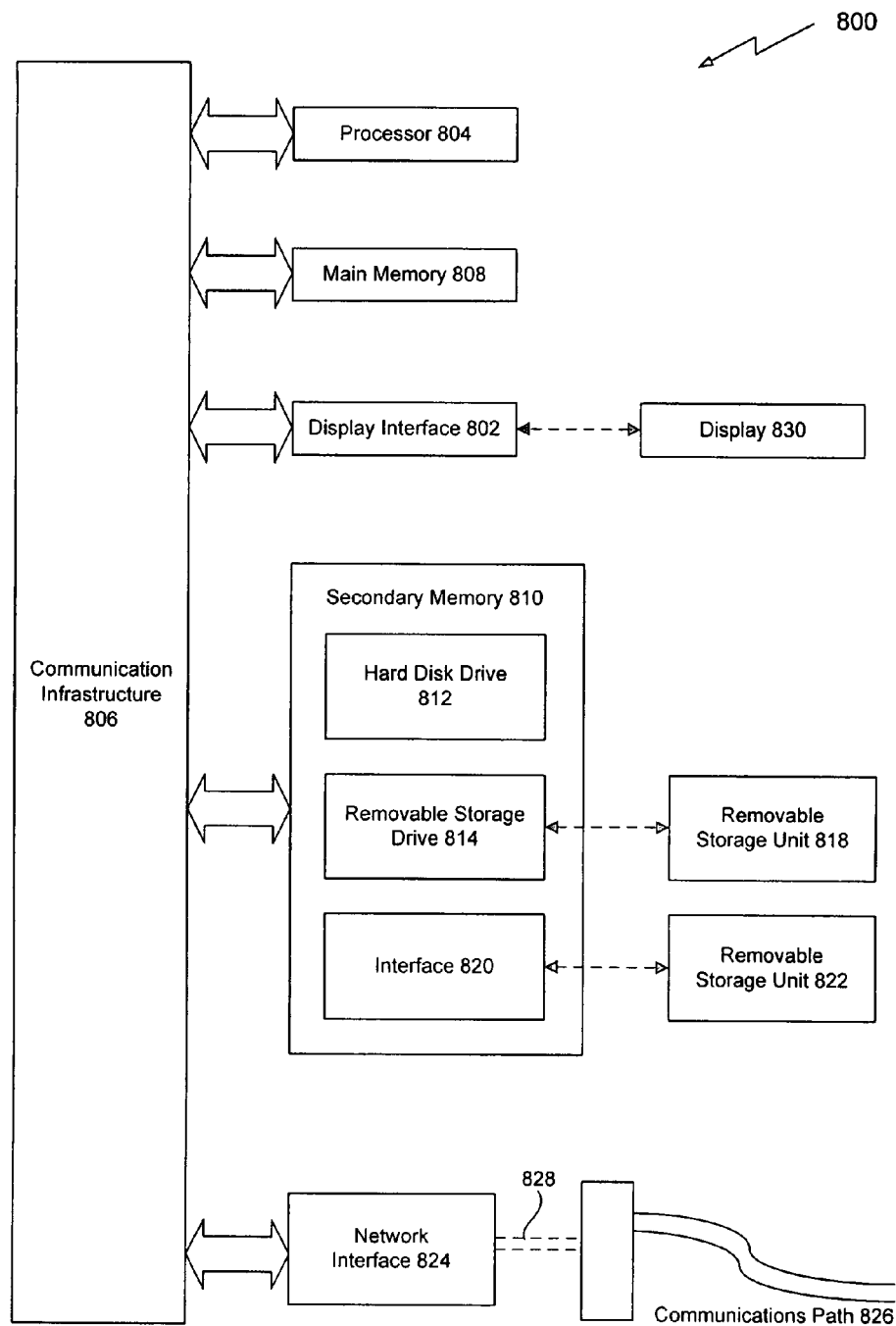
FIG. 8 depicts an example computer system in which the present invention may be implemented.

Various aspects of the present invention can be implemented by software, firmware, hardware, or a combination thereof. FIG. 8 illustrates an example computer system 800 in which the present invention, or portions thereof, can be implemented as computer-readable code. For example, the methods illustrated by signal flow/interaction diagrams 300 of FIG. 3 and 400 of FIG. 4 can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804.

Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814.

As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by signal flow/interaction diagrams 300 of FIG. 3 and 400 of FIG. 4 discussed above. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, in the above, the invention has been described with reference to particular examples, such as PDAs, Pocket PC, M-Business Anywhere, Ajax, etc. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for selecting a service to provide a service operation, comprising:
   identifying one or more sets of services, having a corresponding set of preconditions, that satisfy a set of caller post-conditions, comprising identifying post-conditions for each of the one or more sets of services and comparing the service post-conditions to the set of caller post-conditions according to a rule;
   identifying at least one of the one or more sets of services that has its corresponding set of preconditions satisfied by a set of disclosures available from the caller and subject to caller requirements;
   selecting one of the at least one of the one or more sets of services;
   providing the set of disclosures to the selected set of services;
   receiving a reply from the selected set of services;
   mapping the reply to the set of caller post-conditions; and
   sending the mapped reply to the caller.

2. The method of claim 1, wherein the caller requirements comprise a requirement not to disclose one or more items from the set of disclosures to an additional service.

3. The method of claim 1, wherein the service post-conditions comprise a guarantee not to disclose one or more items from the set of disclosures to an additional service.

4. The method of claim 1, wherein identifying the one or more sets of services that satisfy the set of caller post-conditions comprises:
   determining whether the set of services provides at least a set of outputs correlating with the service requirements.

5. The method of claim 1, wherein identifying the at least one of the one or more sets of services that has its corresponding set of preconditions satisfied by the set of disclosures comprises:

determining whether the set of disclosures provides at least a set of inputs correlating with the preconditions.

6. A computer usable storage device having computer program logic recorded thereon for selecting a service to provide a service operation, execution of which, by a computing device, causes the computing device to perform operations comprising:

identifying one or more sets of services, having a corresponding set of preconditions, that satisfy a set of caller post-conditions, comprising identifying post-conditions for each of the one or more sets of services and comparing the service post-conditions to the set of caller post-conditions according to a rule;

identifying at least one of the one or more sets of services that has its corresponding set of preconditions satisfied by a set of disclosures available from the caller and subject to caller requirements;

selecting one of the at least one of the one or more sets of services;

providing the set of disclosures to the selected set of services;

receiving a reply from the selected set of services;

mapping the reply to the set of caller post-conditions; and sending the mapped reply to the caller.

7. The computer usable storage device of claim 6, wherein the caller requirements comprise a requirement not to disclose one or more items from the set of disclosures to an additional service.

8. The computer usable storage device of claim 6, wherein the service post-conditions comprise a guarantee not to disclose one or more items from the set of disclosures to an additional service.

9. The computer usable storage device of claim 6, wherein identifying the one or more sets of services that satisfy the set of caller post-conditions comprises:

determining whether the set of services provides at least a set of outputs correlating with the service requirements.

10. The computer usable storage device of claim 6, wherein identifying the at least one of the one or more sets of services that has its corresponding set of preconditions satisfied by the set of disclosures comprises:

determining whether the set of disclosures provides at least a set of inputs correlating with the preconditions.

11. A system for selecting a service to provide a service operation, comprising:

a first identifying module configured to identify one or more sets of services, having a corresponding set of preconditions, that satisfy a set of caller post-conditions, further configured to identify post-conditions for each of the one or more sets of services and compare the service post-conditions to the set of caller post-conditions according to a rule;

a second identifying module configured to identify at least one of the one or more sets of services that has its corresponding set of preconditions satisfied by a set of disclosures available from the caller and subject to caller requirements;

a selecting module configured to select one of the at least one of the one or more sets of services;

a providing module configured to provide the set of disclosures to the selected set of services;

a receiving module configured to receive a reply from the selected set of services:

a mapping module configured to map the reply to the set of caller post-conditions; and a sending module configured to send the mapped reply to the caller.

12. The method of claim 1, wherein selecting one of the at least one of the one or more sets of services comprises selecting the one of the at least one of the one or more sets of services needing the fewest disclosures from the caller.

13. The computer usable storage device of claim 6, wherein selecting one of the at least one of the one or more sets of services comprises selecting the one of the at least one of the one or more sets of services needing the fewest disclosures from the caller.

* * * * *